US010287012B2

(12) United States Patent
Robertson et al.

(10) Patent No.: US 10,287,012 B2
(45) Date of Patent: May 14, 2019

(54) AIRCRAFT HAVING RADIALLY EXTENDABLE TAILBOOM ASSEMBLY

(71) Applicant: Bell Helicopter Textron Inc., Fort Worth, TX (US)

(72) Inventors: Daniel Bryan Robertson, Fort Worth, TX (US); Kirk Landon Groninga, Fort Worth, TX (US); Carlos Alexander Fenny, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 335 days.

(21) Appl. No.: 15/241,436

(22) Filed: Aug. 19, 2016

(65) Prior Publication Data

US 2018/0050792 A1   Feb. 22, 2018

(51) Int. Cl.
| | |
|---|---|
| *B64C 25/52* | (2006.01) |
| *B64C 29/02* | (2006.01) |
| *B64C 25/16* | (2006.01) |
| *B64C 9/02* | (2006.01) |
| *B64C 11/00* | (2006.01) |
| *B64C 25/24* | (2006.01) |
| *B64C 13/50* | (2006.01) |

(52) U.S. Cl.
CPC ............... *B64C 29/02* (2013.01); *B64C 9/02* (2013.01); *B64C 11/006* (2013.01); *B64C 25/16* (2013.01); *B64C 25/24* (2013.01); *B64C 25/52* (2013.01); *B64C 13/503* (2013.01); *B64C 2201/088* (2013.01); *B64C 2201/162* (2013.01)

(58) Field of Classification Search
CPC ......... B64C 25/52; B64C 29/00; B64C 29/02; B64C 201/088; B64C 2201/162; B64C 2201/165; B64C 2201/18
See application file for complete search history.

(56) References Cited

U.S. PATENT DOCUMENTS

| | | | | |
|---|---|---|---|---|
| 2,446,480 | A | * | 8/1948 | Leonard .................. B64C 25/62 244/102 R |
| 2,479,125 | A | * | 8/1949 | Leonard .............. B64C 29/0075 244/102 R |
| 5,062,587 | A | | 11/1991 | Wernicke |
| 7,506,837 | B2 | | 3/2009 | Parks |
| 7,518,864 | B2 | | 4/2009 | Kimura |
| 7,641,144 | B2 | | 1/2010 | Kummer et al. |

(Continued)

*Primary Examiner* — Nicholas McFall
(74) *Attorney, Agent, or Firm* — Lawrence Youst PLLC

(57) ABSTRACT

A tail sitter aircraft includes a fuselage having a forward portion, an aft portion and a longitudinally extending fuselage axis. A main lifting surface is supported by the forward portion of the fuselage. A propulsion system is operably associated with the main lifting surface and operable to provide thrust during forward flight, vertical takeoff, hover and vertical landing. A tailboom assembly extends from the aft portion of the fuselage. The tailboom assembly includes a plurality of rotatably mounted tail arms having control surfaces and landing members wherein, in a forward flight configuration, the tail arms are radially retracted to reduce tail surface geometry and provide yaw and pitch control with the control surfaces and, wherein, in a landing configuration, the tail arms are radially extended relative to one another about the fuselage axis to form a stable ground contact base with the landing members.

16 Claims, 8 Drawing Sheets

(56) References Cited

U.S. PATENT DOCUMENTS

| | | |
|---|---|---|
| 8,727,265 B2 | 5/2014 | Altmikus et al. |
| 9,409,643 B2 | 8/2016 | Mores et al. |
| 9,452,832 B2 | 9/2016 | Heid |
| 2012/0111994 A1* | 5/2012 | Kummer .................. B63G 8/18 244/15 |
| 2017/0166306 A1* | 6/2017 | Engbersen .............. B64C 29/02 |

* cited by examiner

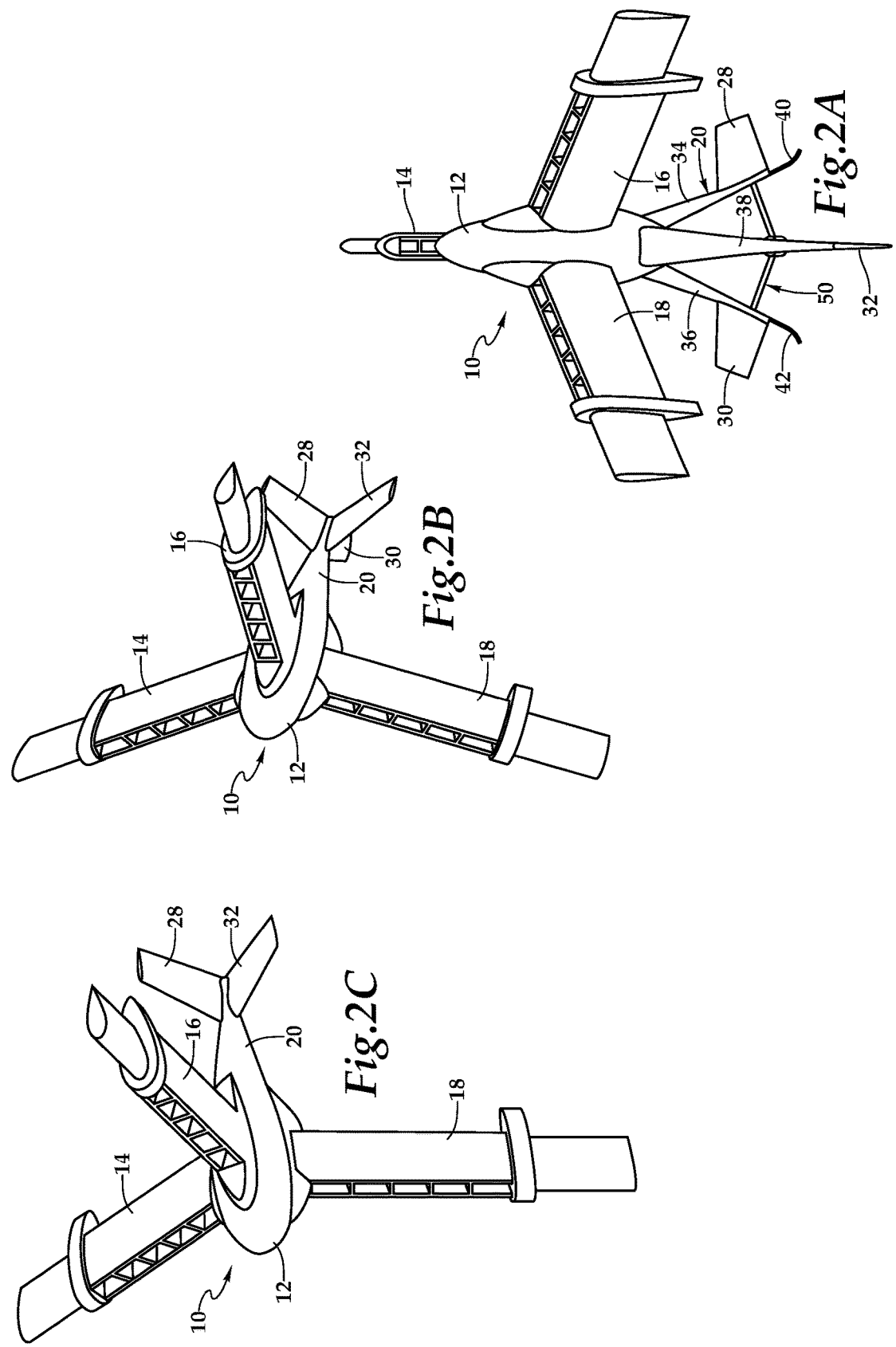

AIRCRAFT HAVING RADIALLY EXTENDABLE TAILBOOM ASSEMBLY

TECHNICAL FIELD OF THE DISCLOSURE

The present disclosure relates, in general, to aircraft that take off and land on their tail and tilt horizontally for forward flight and, in particular, to tail sitter aircraft having a main lifting surface forward of a tailboom assembly that radially extends to form landing gear having a stable ground contact base.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the airplane in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable, forward, backward and lateral flight. These attributes make helicopters highly versatile for use in congested, isolated or remote areas where fixed-wing aircraft may be unable to takeoff and land. Helicopters, however, typically lack the forward airspeed of fixed-wing aircraft.

A tiltrotor aircraft is another example of a VTOL aircraft. Tiltrotor aircraft generate lift and propulsion using proprotors that are typically coupled to nacelles mounted near the ends of a fixed wing. The nacelles rotate relative to the fixed wing such that the proprotors have a generally horizontal plane of rotation for vertical takeoff, hovering and landing and a generally vertical plane of rotation for forward flight, wherein the fixed wing provides lift and the proprotors provide forward thrust. In this manner, tiltrotor aircraft combine the vertical lift capability of a helicopter with the speed and range of fixed-wing aircraft. Tiltrotor aircraft, however, typically suffer from downwash inefficiencies during vertical takeoff and landing due to interference caused by the fixed wing.

A further example of a VTOL aircraft is a tiltwing aircraft that features a rotatable wing that is generally horizontal for forward flight and rotates to a generally vertical orientation for vertical takeoff and landing. Propellers are coupled to the rotating wing to provide the required vertical thrust for takeoff and landing and the required forward thrust to generate lift from the wing during forward flight. The tiltwing design enables the slipstream from the propellers to strike the wing on its smallest dimension, thus improving vertical thrust efficiency as compared to tiltrotor aircraft. Tiltwing aircraft, however, are more difficult to control during hover as the vertically oriented wing provides a large surface area for crosswinds, typically requiring tiltwing aircraft to have either cyclic rotor control or an additional thrust station to generate a moment.

Another example of a VTOL aircraft is a tail sitter aircraft that lands and takes off on its tail section. The longitudinal fuselage axis is generally horizontal during forward flight and is generally vertical for hover, takeoff and landing. A fixed propulsion system is typically used to generate vertical thrust during hover, takeoff and landing and horizontal thrust during forward flight, wherein the wings provide lift. It has been found, however, the tail sitter aircraft having forward wings are unstable on the ground due to a high center of gravity and a large wing surface exposed to wind. Attempts have been made to design tail sitter aircraft with aft wings to lower the center of gravity while the aircraft is on the ground. It has been found, however, that having an aft main lifting surface reduces the aerodynamic stability of the aircraft during forward flight.

SUMMARY

In a first aspect, the present disclosure is directed to a tail sitter aircraft including a fuselage having a forward portion, an aft portion and a longitudinally extending fuselage axis. A main lifting surface is supported by the forward portion of the fuselage. A propulsion system is operably associated with the main lifting surface and is operable to provide thrust during forward flight, vertical takeoff, hover and vertical landing. A tailboom assembly extends from the aft portion of the fuselage. The tailboom assembly includes a plurality of rotatably mounted tail arms having control surfaces and landing members wherein, in a forward flight configuration, the tail arms are radially retracted to reduce tail surface geometry and provide yaw and pitch control with the control surfaces and, wherein, in a landing configuration, the tail arms are radially extended relative to one another about the fuselage axis to form a stable ground contact base with the landing members.

In some embodiments, the main lifting surface may include a pair of generally oppositely disposed wings. In other embodiments, the main lifting surface may include at least three generally circumferentially distributed wings. In certain embodiments, the propulsion system may be a distributed propulsion system such as a propulsion system including a plurality of independently controllable cross-flow fans including independently controllable variable thrust cross-flow fans. In other embodiments, the propulsion system may include at least a pair of rotor assemblies including independently controllable rotor assemblies.

In some embodiments, the tailboom assembly may include at least three rotatably mounted tail arms. In other embodiments, the tailboom assembly may include at least four rotatably mounted tail arms. In certain embodiments, the tailboom assembly may have an actuator assembly operable to transition the tail arms between the forward flight configuration and the landing configuration. The actuator assembly may include a cross arm assembly coupled to each of the tail arms. The actuator assembly may also include one or more linear actuators, one or more rotary actuators or combinations thereof. In addition, the actuator assembly may include a locking system operable to secure the tail arms in one or both of the forward flight configuration and the landing configuration.

In a second aspect, the present disclosure is directed to a tail sitter aircraft including a fuselage having a forward portion, an aft portion and a longitudinally extending fuselage axis. First and second wings are supported by the forward portion of the fuselage and provide a main lifting surface for the aircraft. A propulsion system includes first and second rotor assemblies that are respectively attached to the first and second wings. The propulsion system is operable to provide thrust during forward flight, vertical takeoff, hover and vertical landing. A tailboom assembly extends from the aft portion of the fuselage. The tailboom assembly includes a plurality of rotatably mounted tail arms having control surfaces and landing members wherein, in a forward flight configuration, the tail arms are radially retracted to reduce tail surface geometry and provide yaw and pitch control with the control surfaces and, wherein, in a landing configuration, the tail arms are radially extended relative to one another about the fuselage axis to form a stable ground contact base with the landing members.

In a third aspect, the present disclosure is directed to a tail sitter aircraft including a fuselage having a forward portion, an aft portion and a longitudinally extending fuselage axis. At least three generally circumferentially distributed wings are supported by the forward portion of the fuselage and provide a main lifting surface for the aircraft. A distributed propulsion system is operably associated with the wings and is operable to provide thrust during forward flight, vertical takeoff, hover and vertical landing. A tailboom assembly extends from the aft portion of the fuselage. The tailboom assembly includes a plurality of rotatably mounted tail arms having control surfaces and landing members wherein, in a forward flight configuration, the tail arms are radially retracted to reduce tail surface geometry and provide yaw and pitch control with the control surfaces and, wherein, in a landing configuration, the tail arms are radially extended relative to one another about the fuselage axis to form a stable ground contact base with the landing members.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2A-2F are schematic illustrations of a tail sitter aircraft in a sequential flight operating scenario in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1A:
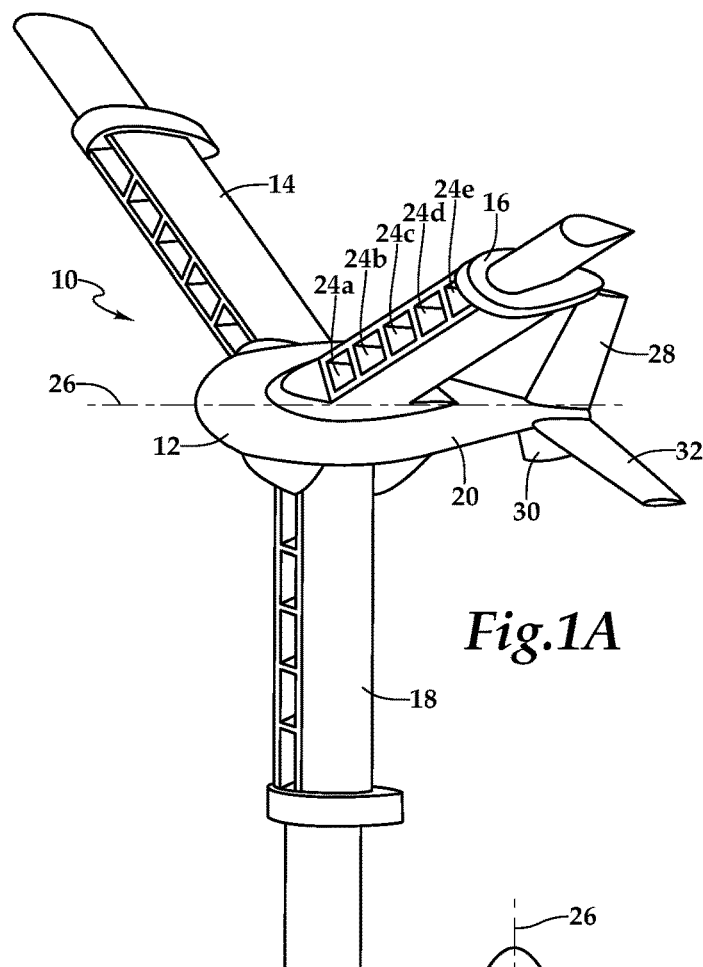
FIGS. 1A-1B are schematic illustrations of a tail sitter aircraft in accordance with embodiments of the present disclosure.
Figure 1B:
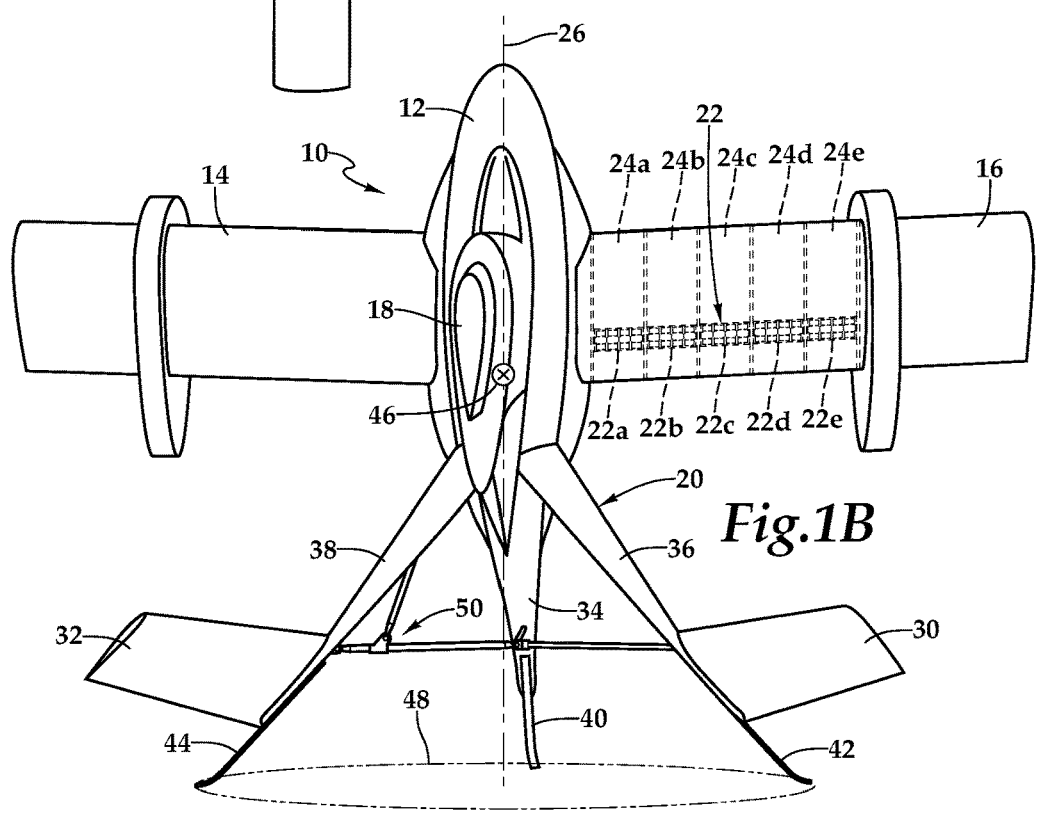

Referring to FIGS. 1A-1B in the drawings, a tail sitter aircraft is schematically illustrated and generally designated 10. Tail sitter aircraft 10 includes a fuselage 12, a plurality of wings 14, 16, 18 and a tailboom assembly 20. As illustrated, wings 14, 16, 18 are forward of tailboom assembly 20 during forward flight and are considered to be supported by a forward portion of fuselage 12 while tailboom assembly 20 extends from an aft portion of fuselage 12. Preferably, wings 14, 16, 18 each have an airfoil cross-section operable to generate lift responsive to the forward airspeed of tail sitter aircraft 10 and form the main lifting surface of tail sitter aircraft 10. Tail sitter aircraft 10 has a propulsion system depicted as a distributed propulsion system 22 including a plurality of propulsion assemblies in the form of cross-flow fans located in chordwise channels of wings 14, 16, 18. For example, cross-flow fans 22A-22E are located in chordwise channels 24A-24E depicted in phantom in wing 16 in FIG. 1B.

Preferably, as discussed herein, the cross-flow fans have variable thrust capacities and may be operated independent of one another. Cross-flow fans of the present disclosure may be operated responsive to one or more electrical motors, hydraulic motors and/or liquid fuel powered engines. One or more cross-flow fans may be operated on a common drive shaft or each cross-flow fan may be operated by a unique drive system. Preferably, variable thrust control, as discussed herein, for each cross-flow fan is independent. Alternatively, more than one cross-flow fan could share a common variable thrust control actuator or system. As illustrated, air enters cross-flow fans 22A-22E from a forward intake portion of a respective chordwise channel 24A-24E and exits cross-flow fans 22A-22E into an aft discharge portion of a respective chordwise channel 24A-24E, thereby generating thrust generally parallel to a longitudinal fuselage axis 26. The aft portions of chordwise channels may include flaperons or other flow directing members to enable thrust vectoring.

Tailboom assembly 20 includes a plurality of control surfaces used during forward flight depicted as rudder 28 for yaw control and elevators 30, 32 for pitch control, in the illustrated configuration. It is noted that tail sitter aircraft 10 may fly in other orientations wherein the control surfaces may serve alternate functions. For example, if wings 16, 18 are above fuselage 12 and wing 14 is below fuselage 12, then control surface 32 would operate as the rudder and control surfaces 28, 30 would operate as the elevators. In addition, even though tail sitter aircraft 10 is depicted and described as having three wings that are circumferentially distributed uniformly about fuselage 12, it should be understood by those skilled in the art that a tail sitter aircraft of the present disclosure could have other numbers of wings both greater than and less than three and/or have wings that are oriented in a nonuniform manner. In the present example, instead of wings 14, 16, 18 being oriented at 120-degree circumferential intervals (120/120/120), the wings could be oriented as 105/150/105, 90/180/90 or other desired wing orientation permutation. Also, even though control surface 28, 30, 32 are depicted as being circumferentially offset from wings 14, 16, 18 by 60 degrees, it should be understood by those skilled in the art that control surfaces for a tail sitter aircraft of the present disclosure could have other orientations relative to the wings including being circumferentially inline with the wings. Further, even though the same number of wings and control surfaces has been depicted, it should be understood by those skilled in the art that the number of control surfaces and the number of wings are independent of each other.

Tailboom assembly 20 includes a plurality of tail arms 34, 36, 38 that are operable to be radially retracted in forward flight, as best seen in FIG. 1A, forming a small tail surface geometry wherein control surfaces 28, 30, 32 provide yaw and pitch control. In addition, tail arms 34, 36, 38 are operable to be radially extended for landing, as best seen in FIG. 1B, forming a stable ground contact base. As illustrated, each tail arm 34, 36, 38 includes one of the control surface 28, 30, 32. As illustrated, each tail arm 34, 36, 38 includes a landing member 40, 42, 44 such as a fixed or retractable skid member or shock absorbing member such as a pneumatic shock strut or mechanical spring assembly. Landing members 40, 42, 44 may also include wheels to assist in ground maneuvers. The length of tail arms 34, 36, 38 as well as the angle tail arms 34, 36, 38 make with longitudinal fuselage axis 26 in the landing configuration may be determined based upon the location of the center of gravity 46 of tail sitter aircraft 10. Preferably, center of gravity 46 should be located within the tip over angle from the ground contact base 48 of landing member 40, 42, 44, wherein the tip over angle may be about 55 degrees. As discussed herein, tailboom assembly 20 includes an actuator assembly 50 operable to transition tail arms 34, 36, 38 between the forward flight configuration and the landing configuration. Tail arms 34, 36, 38 may also include one or more sensors that indicate the position of tail arms 34, 36, 38 such as fully retracted and fully deployed as well as fault positions if tail arms 34, 36, 38 fail to reach the fully retracted and/or the fully deployed positions. Tail arms 34, 36, 38 may also include a fail safe mechanism to bias tail arms 34, 36, 38 toward the landing configuration in the event of a tail arm fault.

Figure 1C:
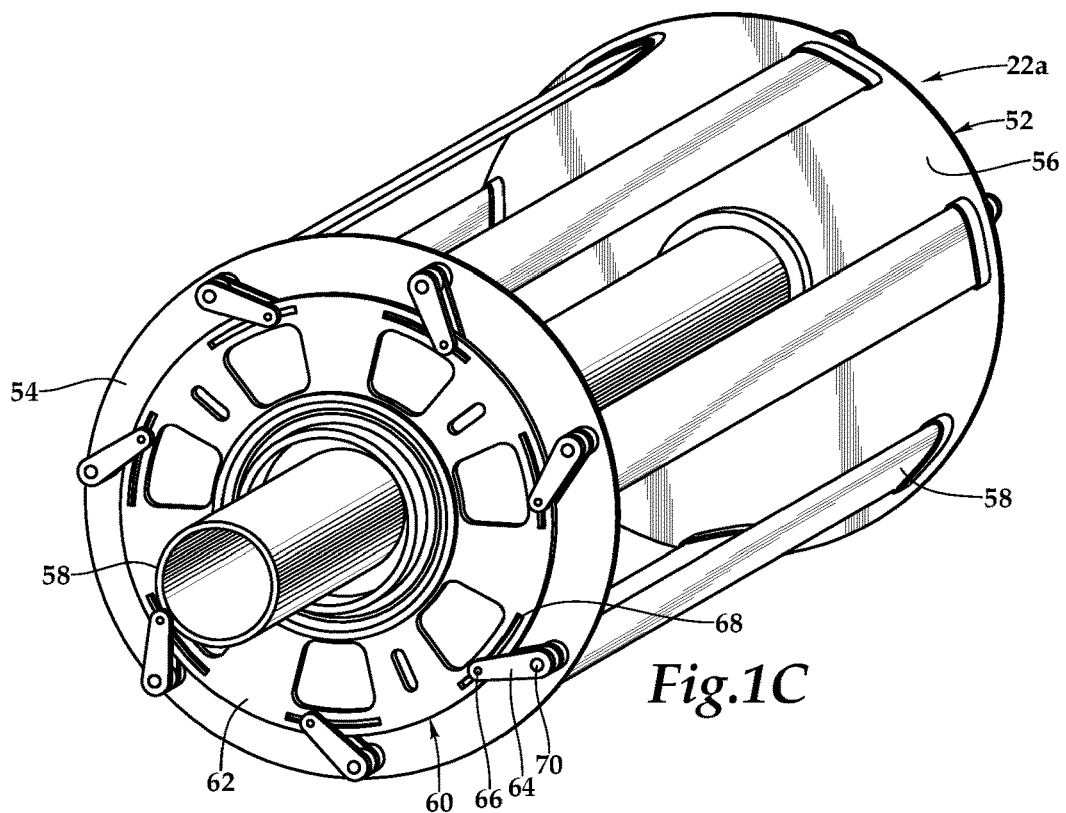
FIGS. 1C-1D are schematic illustrations of a variable thrust cross-flow fan system for a tail sitter aircraft in accordance with embodiments of the present disclosure.

Referring to FIG. 1C, therein is depicted an embodiment of a variable thrust cross-flow fan, such as variable thrust cross-flow fan 22A of FIG. 1B. Variable thrust cross-flow fan 22A includes a cross-flow fan assembly 52 including driver plates 54, 56 which are coupled to and are rotatable about a longitudinal axis by a drive shaft 58. Cross-flow fan assembly 52 includes a plurality of blades 58 that are each rotatably coupled between driver plates 54, 56. As illustrated, blades 58 are disposed radially outwardly from the longitudinal axis such that blades 58 follow a generally circular path of travel when cross-flow fan assembly 52 rotates about the longitudinal axis. Variable thrust cross-flow fan 22A includes a control assembly 60 that is coupled to each of blades 58. In the illustrated embodiment, control assembly 60 includes a control cam 62 that is rotatable with and translatable relative to cross-flow fan assembly 52. Control assembly 60 also includes a plurality of linkages 64 that are slidably coupled to control cam 62 via follower pins 66 in follower slots 68 of driver plate 54 and fixably coupled to blades 58 via driver pins 70 that extend through linkage holes (not visible) of driver plate 54.

When cross-flow fan assembly 52 is rotated by drive shaft 58 and control cam 62 is positioned concentrically with cross-flow fan assembly 52, follower pins 66 do not move relative to follower slots 68 and blades 58 do not rotate relative to driver plates 54, 56. In this state, blades 58 are in a neutral configuration wherein each of the blades 58 has a substantially zero pitch during an entire revolution of cross-flow fan assembly 52, as illustrated in FIG. 1C. In this neutral configuration, all of blades 58 have a substantially zero angle of attack and therefore produce little or no thrust. To produce thrust, blades 58 are rotated relative to driver plates 54, 56 in response to shifting control cam 62 forward, in the chordwise direction of wing 16, relative to cross-flow fan assembly 52. When control cam 62 is position eccentrically relative to cross-flow fan assembly 52 and cross-flow fan assembly 52 is rotated by drive shaft 58, follower pins 66 cyclically slide within follower slots 68 which cyclically pivots linkages 64 and cyclically rotates blades 58 relative to driver plates 54, 56.

Figure 1D:
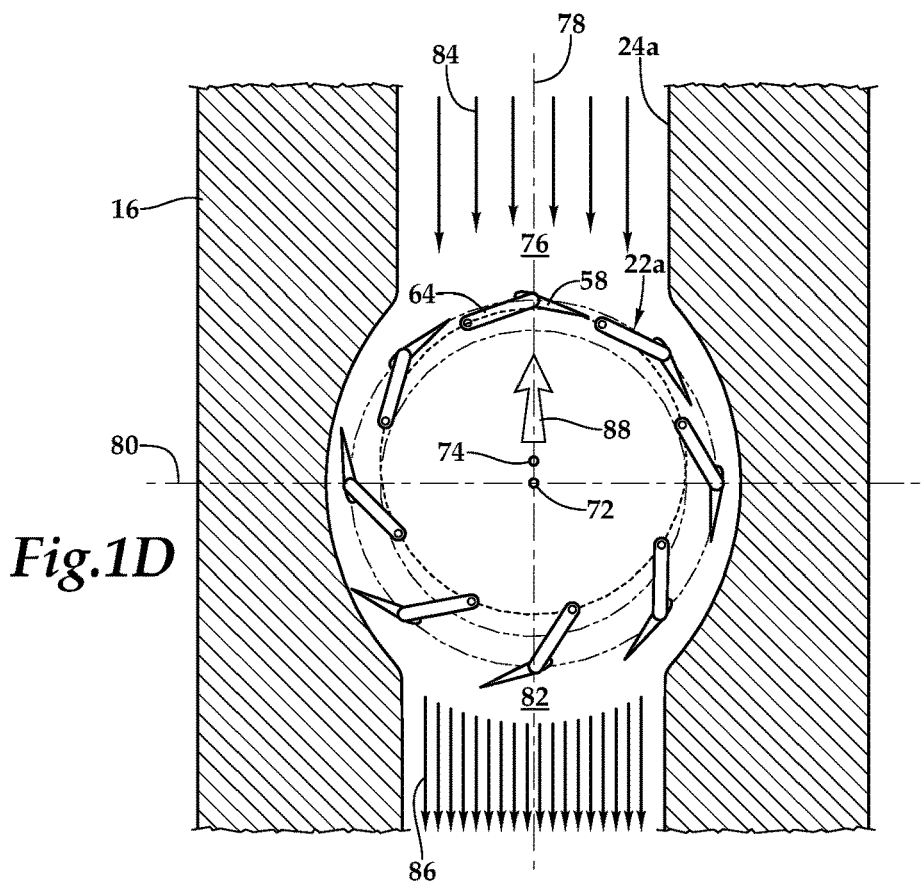

Referring additionally to FIG. 1D, variable thrust cross-flow fan 22A is disposed within chordwise channel 24A of wing 16. In the illustrated configuration, the center of rotation of control cam 62 has been shifted forward from a concentric location 72 to an eccentric location 74. In this configuration, as each blade 58 follows the generally circular path of travel, the blades transition between positive pitch, zero pitch, negative pitch, zero pitch and back to positive pitch during each revolution of cross-flow fan assembly 52. As illustrated, blades 58 have an airfoil cross section and travel in a counterclockwise direction. As blades 58 approach forward intake 76 of chordwise channel 24A, the blades have progressively greater positive pitch reaching a maximum positive pitch proximate axis 78. Thereafter, as blades 58 retreat from forward intake 76, the blades have progressively lesser positive pitch reaching zero pitch proximate axis 80. As blades 58 approach aft discharge 82 of chordwise channel 24A, the blades have progressively greater negative pitch reaching a maximum negative pitch proximate axis 78. Thereafter, as blades 58 retreat from aft discharge 82, the blades have progressively lesser negative pitch, reaching zero pitch proximate axis 80. Each blade 58 repeats this cycle on each revolution of cross-flow fan assembly 52.

As blades 58 follow the generally circular path of travel with the cyclically varying angle of attack described herein, air passes through cross-flow fan assembly 52 as indicated by low-density intake airflow arrows 84 and high-density discharge airflow arrow 86 with the resultant thrust indicated by arrow 88. The magnitude of thrust 88 generated by variable thrust cross-flow fan system 22A is determined by factors including the magnitude of the eccentricity applied to control cam 62, the rotational speed of cross-flow fan assembly 52, the cross sectional shape of blades 58, the pitch cycle of blades 58, the number of blades 58 and other factors known to those having skill in the art.

Figure 2D:
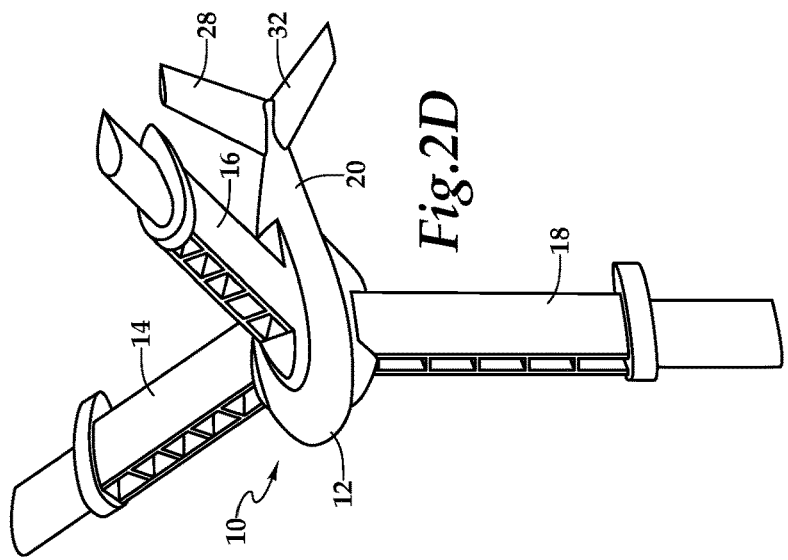

Referring next to FIGS. 2A-2F in the drawings, a sequential flight-operating scenario of tail sitter aircraft 10 is depicted. Tail sitter aircraft 10 may be a manned or unmanned aircraft and may be operated responsive to onboard pilot flight control, remote flight control or autonomous flight control. Tail sitter aircraft 10 is preferably a fly-by-wire aircraft including an onboard flight control computing system that is operable to receive sensor data from and send flight commands to propulsion system controllers, flaperon controllers, control surface controllers, tailboom actuator assembly controllers, landing member actuator controllers, other systems controllers and the like. Preferably, onboard flight control computing system is operable to individually and independently control and operate each of the propulsion assemblies. As best seen in FIG. 2A, tail sitter aircraft 10 is in its vertical takeoff and landing configuration. Preferably, all propulsion assemblies are operating to provide maximum thrust and control during vertical takeoff and hover operations. As tail sitter aircraft 10 continues its vertical assent to a desired elevation, it may begin the transition from the vertical takeoff and landing configuration toward the forward flight configuration.

As best seen in FIG. 2B, as tail sitter aircraft 10 transitions from vertical takeoff and landing to forward flight, tailboom actuator assembly 50 radially retracts tail arms 34, 36, 38 such that tailboom 20 has a reduced tail surface geometry. Tail sitter aircraft 10 also begins to transition its longitudinal fuselage axis 26 from the vertical attitude toward the horizontal attitude. As best seen in FIG. 2C, tail sitter aircraft 10 has completed the transition to forward flight mode. During forward flight, it may be desirable to maximize flight efficiency, which in turn increases the endurance of tail sitter aircraft 10. One way to increase efficiency is to fly tail sitter aircraft 10 with a single wing, in this case wing 18, in the down position and with wings 14, 16 extending upwardly at approximately 30 degrees relative to a horizontal axis. In the illustrated embodiment, this position results in desirably oriented control surfaces depicted as rudder 28 for yaw control and elevators 30, 32 for pitch control. In addition, once tail sitter aircraft 10 is in the forward flight mode, the thrust requirements are reduced compared to the thrust requirements of vertical takeoff and hovering. Accordingly, in forward flight mode, the thrust output of one or more of the propulsion assemblies may be reduced by, for example, reducing the eccentricity of control cam 62 relative to cross-flow fan assembly 52. Alternatively or additionally, one or more of the propulsion assemblies may be shut down during forward flight. It is noted that during forward flight, aerodynamic forces tend to bias tail arms 34, 36, 38 toward the radially retracted, forward flight configuration.

Figure 2E:
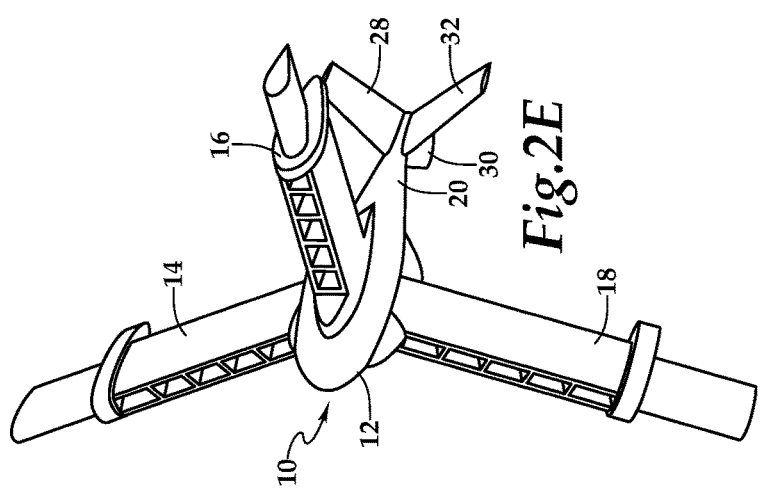
Figure 2F:
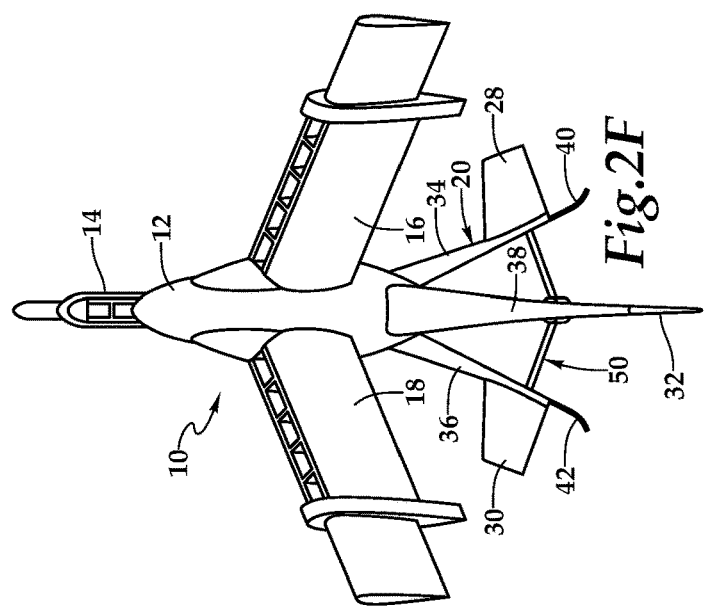

Continuing with the current example, as tail sitter aircraft 10 approaches the destination, all propulsion assemblies are preferably reengaged to provide full propulsion capabilities while remaining in forward flight mode, as best seen in FIG. 2D. Thereafter, tail sitter aircraft 10 may begin its transition from forward flight mode to vertical takeoff and landing mode, as best seen in FIG. 2E, wherein longitudinal fuselage axis 26 shifts from the horizontal attitude toward the vertical attitude. As tail sitter aircraft 10 continues its vertical descent, as best seen in FIG. 2F, tailboom actuator assembly 50 radially extends tail arms 34, 36, 38 such that tailboom 20 forms a stable ground contact base. In addition, tailboom actuator assembly 50 may deploy landing members 40, 42, 44, if they were retracted during forward flight mode.

Figure 3A:
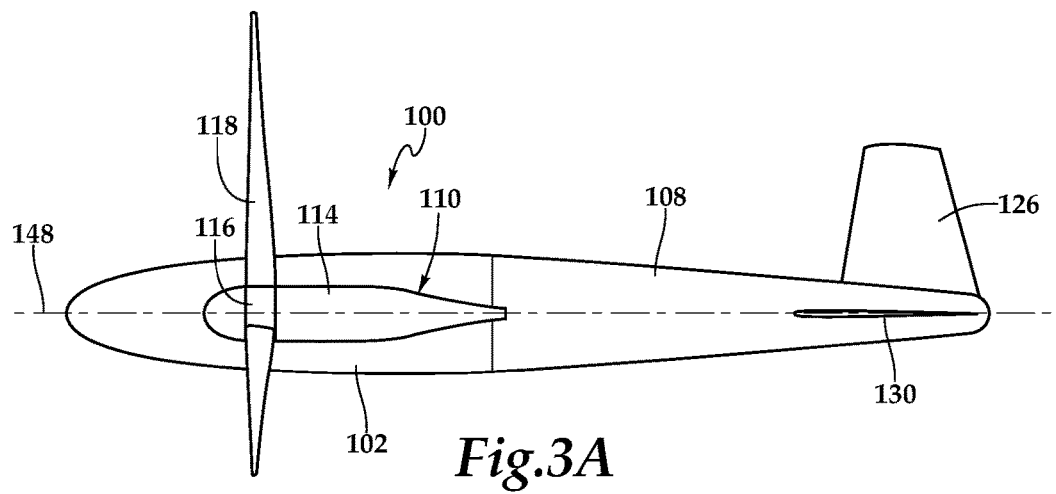
FIGS. 3A-3B are schematic illustrations of a tail sitter aircraft in accordance with embodiments of the present disclosure.
Figure 3B:
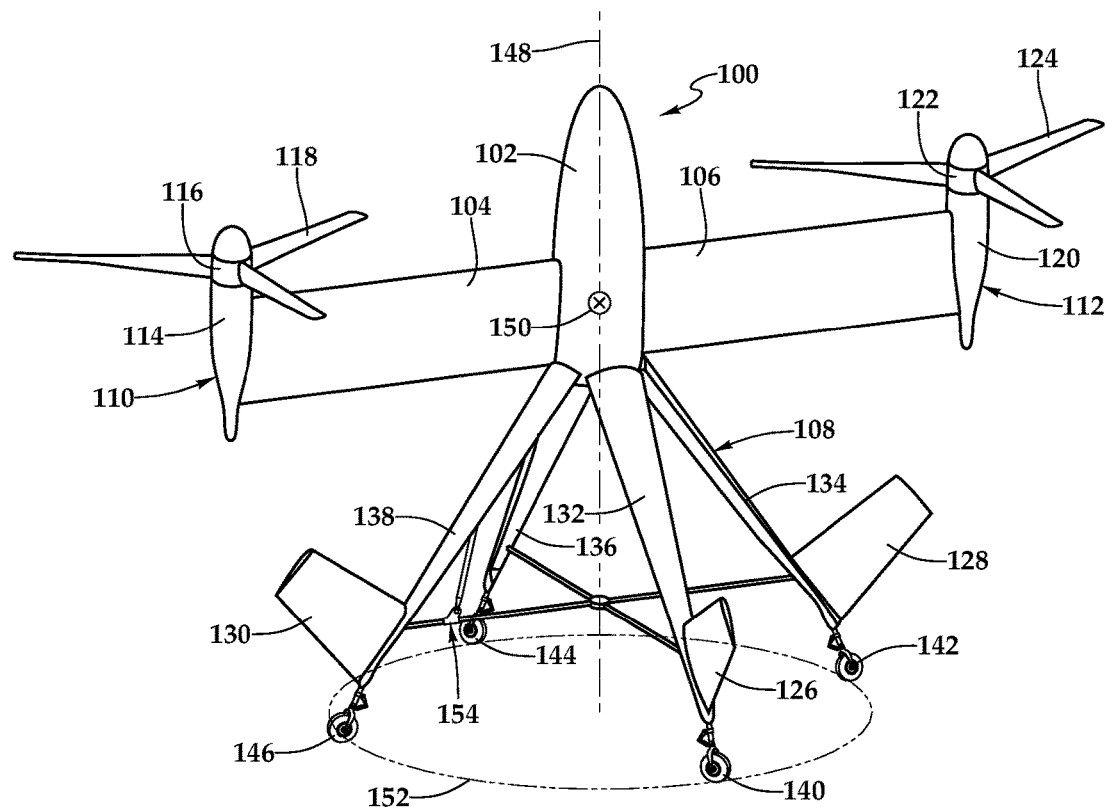
Figure 4A:
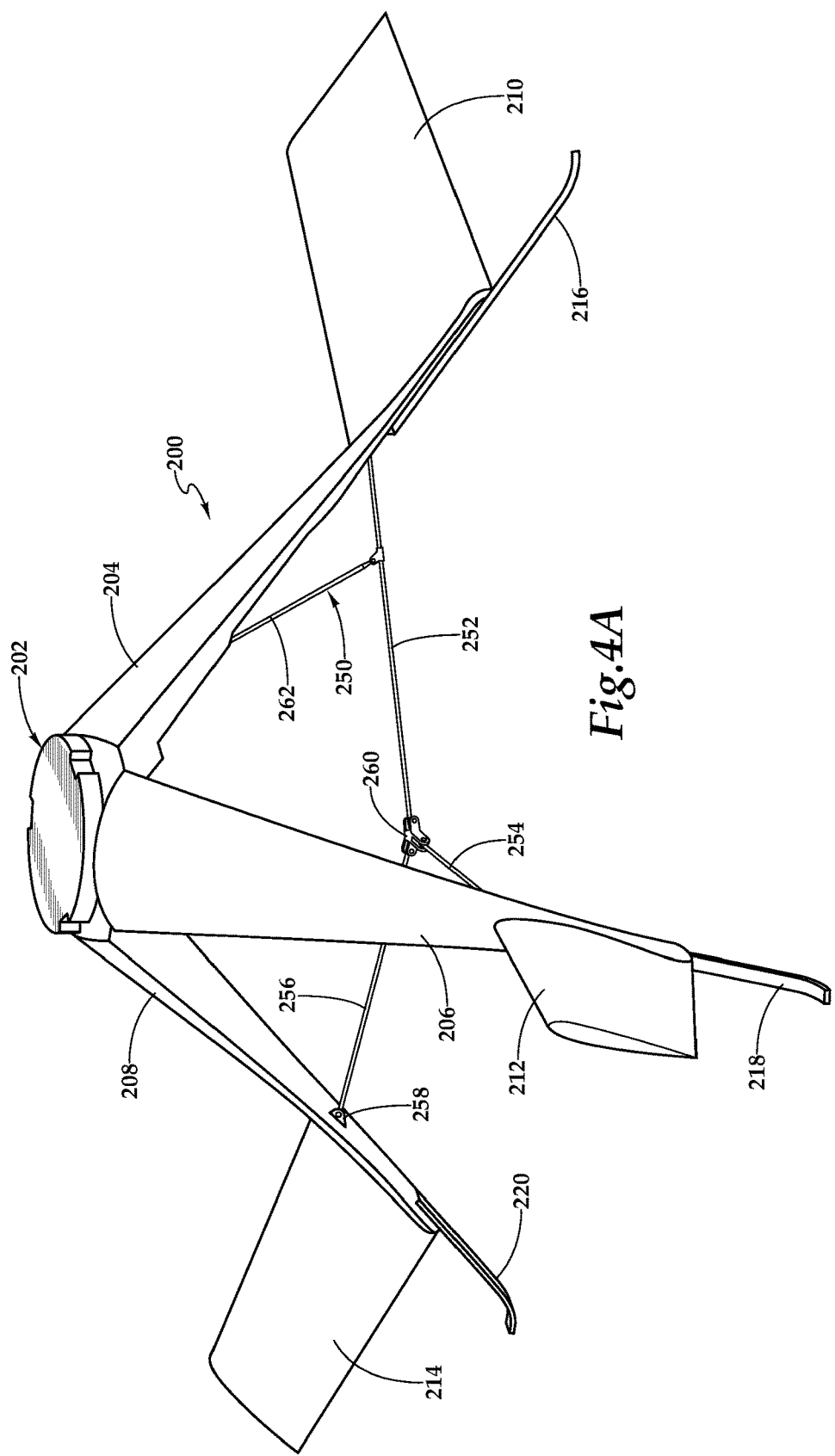
FIGS. 4A-4D are various views of a tailboom assembly for a tail sitter aircraft in accordance with embodiments of the present disclosure.
Figure 4B:
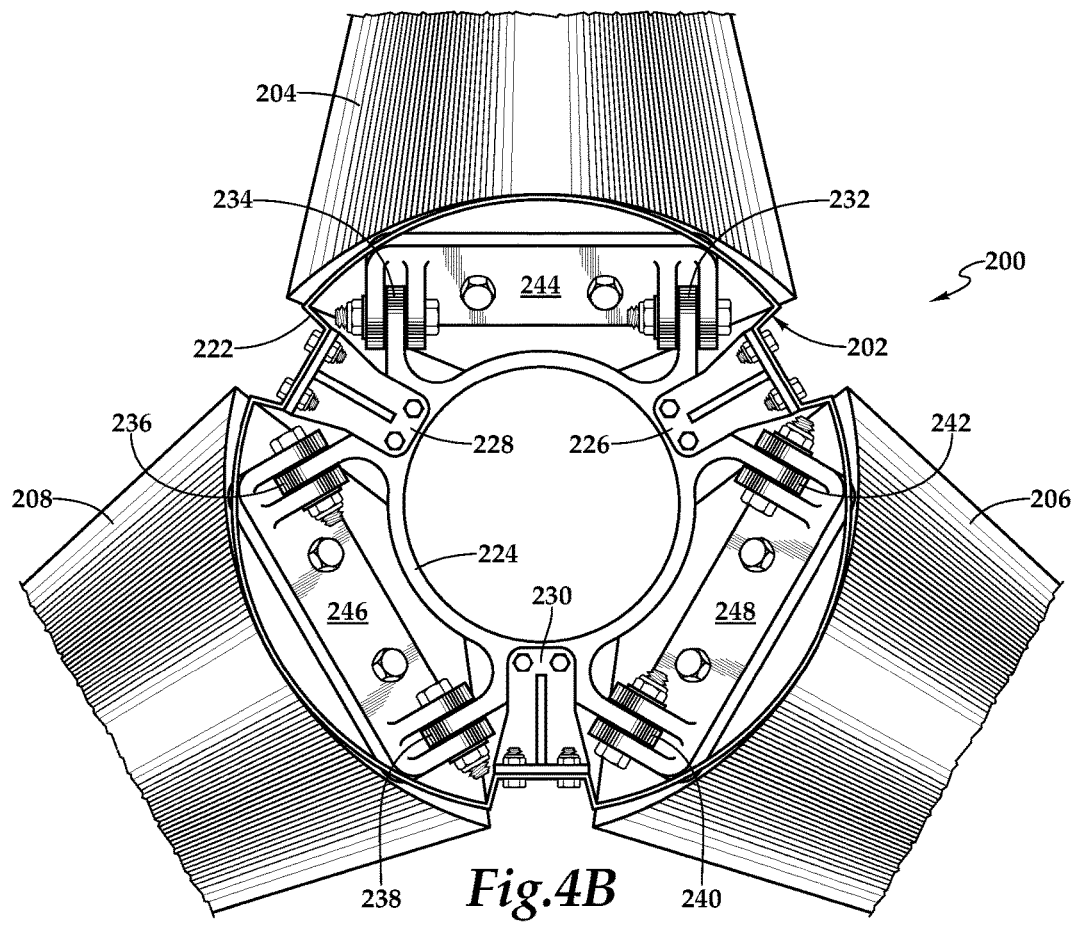
Figure 4C:
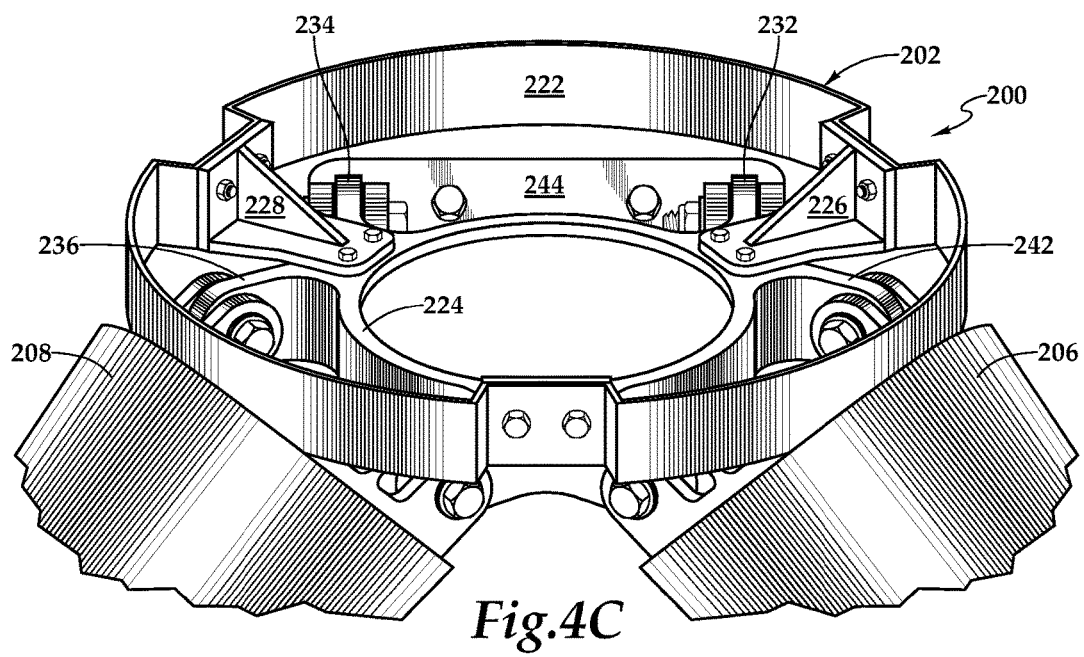
Figure 4D:
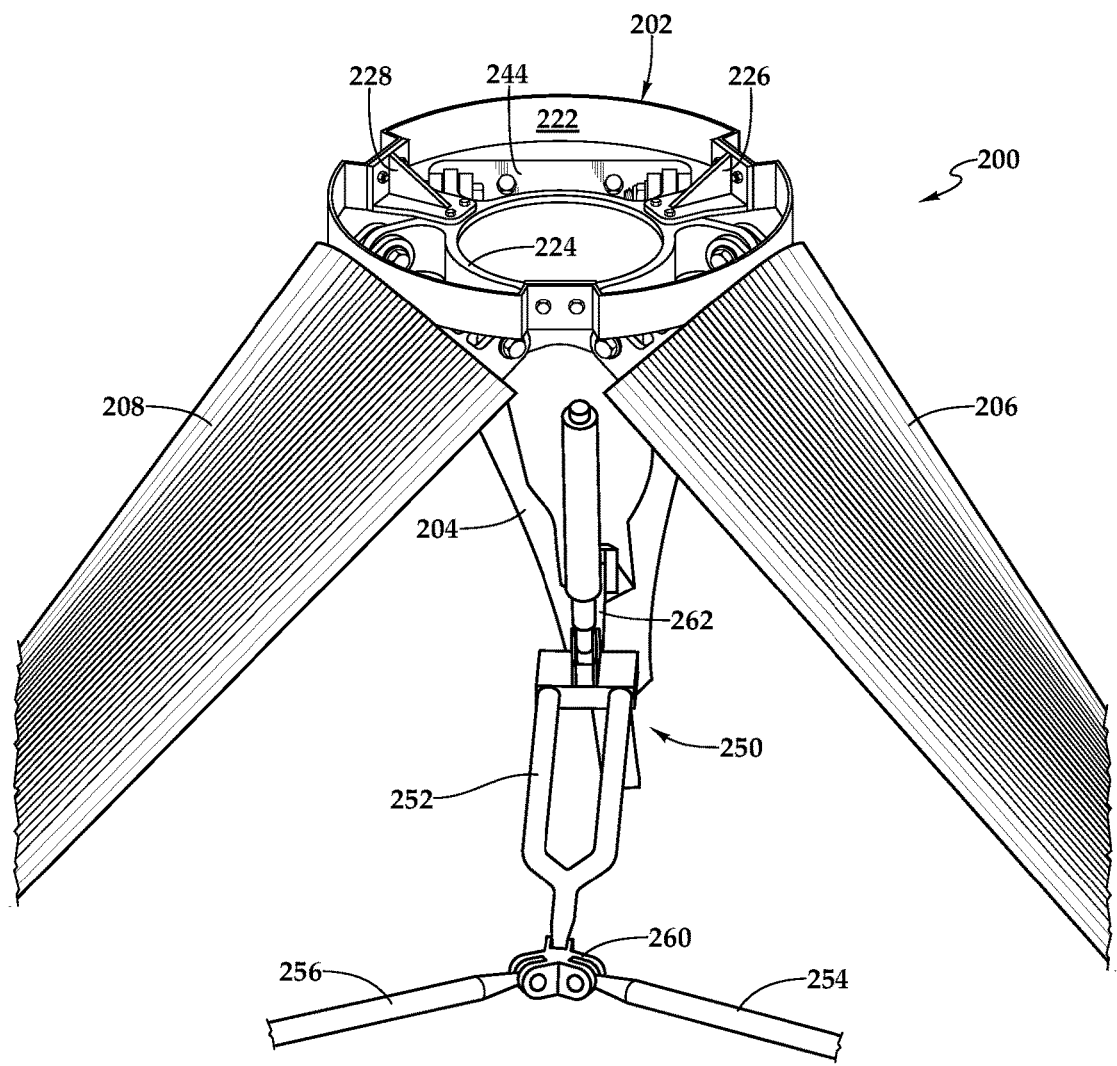

Referring to FIGS. 3A-3B in the drawings, a tail sitter aircraft is schematically illustrated and generally designated 100. Tail sitter aircraft 100 includes a fuselage 102, a pair of wings 104, 106 and a tailboom assembly 108. As illustrated, wings 104, 106 are forward of tailboom assembly 108 during forward flight and are considered to be supported by a forward portion of fuselage 102 while tailboom assembly 108 extends from an aft portion of fuselage 102. Preferably, wings 104, 106 each have an airfoil cross-section operable to generate lift responsive to the forward airspeed of tail sitter aircraft 100 and form the main lifting surface of tail sitter aircraft 100. Tail sitter aircraft 100 includes a pair of propulsion assemblies depicted as rotor assemblies 110, 112. Rotor assembly 110 includes a fixed nacelle 114 that houses an engine and transmission that provide torque and rotational energy to a drive shaft that rotates a rotor hub assembly 116 and a plurality of rotor blade assemblies 118. Likewise, rotor assembly 112 includes a fixed nacelle 120 that houses an engine and transmission that provide torque and rotational energy to a drive shaft that rotates a rotor hub assembly 122 and a plurality of rotor blade assemblies 124.

Even though tail sitter aircraft 100 is depicted as having a particular number of rotor assemblies, it should be understood by those skilled in the art that a tail sitter aircraft of the present disclosure could have any desired number of rotor assemblies, wherein the operation of the rotor assemblies may be independent. Likewise, even though rotor assemblies 110, 112 are depicted as having a particular number of rotor blade assemblies, it should be understood by those skilled in the art that rotor assemblies of the present disclosure could have any desired number of rotor blade assemblies. Also, even though rotor blade assemblies 118, 124 are depicted as having a particular length and twist, it should be understood by those skilled in the art that rotor blade assemblies of the present disclosure could have any desired configuration suitable for providing vertical thrust in landing configuration and forward thrust in forward flight configuration.

Tailboom assembly 108 includes a plurality of control surfaces used during forward flight depicted as rudder 126 for yaw control and elevators 128, 130 for pitch control. Tailboom assembly 108 also includes a plurality of tail arms 132, 134, 136, 138 that are operable to be radially retracted in forward flight, as best seen in FIG. 3A, forming a small tail surface geometry wherein control surfaces 128, 130, 132 provide yaw and pitch control. In addition, tail arms 132, 134, 136, 138 are operable to be radially extended for landing, as best seen in FIG. 3B, forming a stable ground contact base. As illustrated, tail arm 132 includes rudder 126, tail arm 134 includes elevator 128 and tail arm 138 includes elevator 130. Also, each tail arm 132, 134, 136, 138 includes a landing member 140, 142, 144, 146, illustrated as pneumatic shock struts with wheels. The length of tail arms 132, 134, 136, 138 as well as the angle tail arms 132, 134, 136, 138 make with a longitudinal fuselage axis 148 in the landing configuration may be determined based upon the location of the center of gravity 150 of tail sitter aircraft 100. Preferably, center of gravity 150 should be located within the tip over angle from the ground contact base 152 of landing members 140, 142, 144, 146. As discussed herein, tailboom assembly 108 includes an actuator assembly 154 operable to transition tail arms 132, 134, 136, 138 between the forward flight configuration and the landing configuration.

Referring next to FIGS. 4A-4D of the drawings, various views of a tailboom assembly for a tail sitter aircraft are illustrated and generally designated 200. Tailboom assembly 200 includes a mounting assembly 202 that is operable to be connected to an aft portion of the fuselage of a tail sitter aircraft by bolting, pining, threading, welding or other suitable coupling technique. In the illustrated embodiment, tailboom assembly 200 includes three tail arms 204, 206, 208. As discussed herein, tail arms 204, 206, 208 are operable to be radially retracted in a forward flight mode to form a small tail surface geometry wherein control surfaces 210, 212, 214 provide yaw and pitch control. In addition, tail arms 204, 206, 208 are operable to be radially extended in a landing mode to form a stable ground contact base with landing members 216, 218, 220. Mounting assembly 202 includes a frame member 222 that may be a component of tailboom assembly 200 or a component of the aft portion of the fuselage of a tail sitter aircraft, depending upon the implementation. Mount assembly 202 also includes a tail arm attachment fitting 224 that is securably coupled to frame member 222 by three brackets 226, 228, 230. In the illustrated embodiment, brackets 226, 228, 230 are bolted to frame member 222 and tail arm attachment fitting 224, however, those skilled in the art will recognize that brackets of the present disclosure may be secured to frame members and tail arm attachment fittings of the present disclosure using other coupling techniques including pins, rivets, welding, adhesion and the like. Alternatively, brackets of the present disclosure could be integral with frame members and/or tail arm attachment fittings of the present disclosure. Tail arm attachment fitting 224 has a plurality of flanges 232, 234, 236, 238, 240, 242, each having an eyehole (not visible) for receiving a fastener therethrough.

Tail arms 204, 206, 208 each include a dual clevis bracket assembly 244, 246, 248 attached to a forward end thereof. In the illustrated embodiment, dual clevis bracket assemblies 244, 246, 248 are bolted to tail arms 204, 206, 208, however, those skilled in the art will recognize that dual clevis bracket assemblies of the present disclosure may be secured to tail arms of the present disclosure using other coupling techniques including pins, rivets, welding, adhesion and the like. As illustrated, dual clevis bracket assembly 244 mates with flanges 232, 234 of tail arm attachment fitting 224 and is rotatably coupled therewith using bolt connections. Likewise, dual clevis bracket assembly 246 mates with flanges 236, 238 of tail arm attachment fitting 224 and is rotatably coupled therewith using bolt connections and dual clevis bracket assembly 248 mates with flanges 240, 242 of tail arm attachment fitting 224 and is rotatably coupled therewith using bolt connections. Even though dual clevis bracket assemblies 244, 246, 248 are depicted as being rotatably coupled to tail arm attachment fitting 224 using bolt connections, it should be understood by those skilled in the art that dual clevis bracket assemblies of the present disclosure may be rotatably coupled to tail arm attachment fitting of the present disclosure using other coupling techniques including pins, bearings and the like.

The illustrated mounting assembly 202 enables tail arms 204, 206, 208 to rotate relative to the fuselage of a tail sitter aircraft such that tail arms 204, 206, 208 are operable to radially retract in a forward flight configuration and radially extend in a landing configuration, as discussed herein. Even though mounting assembly 202 has been depicted and described as having a particular array of components in a particular configuration, it should be understood by those skilled in the art that a mounting assembly of the present disclosure may have fewer components, more components and/or different components.

Tailboom assembly 200 includes an actuator assembly 250 operable to transition tail arms 204, 206, 208 between the forward flight configuration and the landing configuration. In the illustrated embodiment, actuator assembly 250 includes three brace arms 252, 254, 256 that are rotatably mounted to tail arms 204, 206, 208 at outer support members, only outer support member 258 of tail arm 208 being visible in the drawings. In addition, brace arms 252, 254, 256 are rotatably coupled to a central support member 260 that guilds movement of brace arms 252, 254, 256 during transitions between the forward flight configuration and the landing configuration. Preferably, brace arms 252, 254, 256 form a truss structure between tail arms 204, 206, 208 when the tail sitter aircraft is on the ground to reduce or prevent bending moments in tail arms 204, 206, 208. In the illustrated embodiment, brace arms 252, 254, 256 are moved together as a unit by actuator 262, thereby rotating tail arms 204, 206, 208 together during transitions between the forward flight configuration and the landing configuration. Preferably, actuator 262 is an electrically operated actuator that may be a linear actuator, a rotary actuator or a combination thereof. As illustrated, actuator 262 is supported by a tail arm, namely tail arm 204, but could alternatively be supported by mounting assembly 202 or another component of the tail sitter aircraft.

Actuator 262 includes a brake system operable to secure actuator 262 in desired positions, thereby enabling actuator 262 to serve as a lock against unwanted rotational movement of tail arms 204, 206, 208. For example, it may be desirable to lock tail arms 204, 206, 208 in the forward flight configuration and/or the landing configuration for security and safety. Alternatively or additionally, a locking system separate from actuator 262 may be used to secure tail arms 204, 206, 208 in the forward flight configuration and/or the landing configuration. Even though a single actuator 262 has been depicted and described for transitioning tail arms 204, 206, 208 between the forward flight configuration and the landing configuration, it should be understood by those skilled in the art that tail arm transitioning for a tail sitter aircraft of the present disclosure could utilize other actuation protocols including having individual actuators for each tail arm. In addition, actuator 262 or another actuation system may be used to deploy landing members 216, 218, 220 in embodiments having retractable landing members.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A tail sitter aircraft comprising:
    a fuselage having a forward portion, an aft portion and a longitudinally extending fuselage axis;
    a main lifting surface supported by the forward portion of the fuselage;
    a propulsion system operably associated with the main lifting surface and operable to provide thrust during forward flight, vertical takeoff, hover and vertical landing;
    a tailboom assembly extending from the aft portion of the fuselage, the tailboom assembly including a plurality of rotatably mounted tail arms having control surfaces and landing members; and an actuator assembly operable to transition the tail arms between a forward flight configuration and a landing configuration, the actuator assembly including at least one rotary actuator;

wherein, in the forward flight configuration, the tail arms are radially retracted to reduce tail surface geometry and provide yaw and pitch control with the control surfaces; and wherein, in the landing configuration, the tail arms are radially extended relative to one another about the fuselage axis to form a stable ground contact base with the landing members.

2. The tail sitter aircraft as recited in claim 1 wherein the main lifting surface further comprises at least three generally circumferentially distributed wings.

3. The tail sitter aircraft as recited in claim 1 wherein the propulsion system further comprises a distributed propulsion system.

4. The tail sitter aircraft as recited in claim 1 wherein the propulsion system further comprises a plurality of cross-flow fans.

5. The tail sitter aircraft as recited in claim 1 wherein the propulsion system further comprises a plurality of variable thrust cross-flow fans.

6. The tail sitter aircraft as recited in claim 1 wherein the tailboom assembly further comprises at least three rotatably mounted tail arms.

7. The tail sitter aircraft as recited in claim 1 wherein the actuator assembly further comprises at least one linear actuator.

8. The tail sitter aircraft as recited in claim 1 wherein the actuator assembly further comprises a locking system operable to secure the tail arms in at least one of the forward flight configuration and the landing configuration.

9. A tail sitter aircraft comprising:
a fuselage having a forward portion, an aft portion and a longitudinally extending fuselage axis;
at least three generally circumferentially distributed wings supported by the forward portion of the fuselage, the wings providing a main lifting surface;
a distributed propulsion system operably associated with the main lifting surface and operable to provide thrust during forward flight, vertical takeoff, hover and vertical landing; and
a tailboom assembly extending from the aft portion of the fuselage, the tailboom assembly including a plurality of rotatably mounted tail arms having control surfaces and landing members;

wherein, in a forward flight configuration, the tail arms are radially retracted to reduce tail surface geometry and provide yaw and pitch control with the control surfaces; and wherein, in a landing configuration, the tail arms are radially extended relative to one another about the fuselage axis to form a stable ground contact base with the landing members.

10. The tail sitter aircraft as recited in claim 9 wherein the tailboom assembly further comprises at least three rotatably mounted tail arms.

11. The tail sitter aircraft as recited in claim 9 wherein the distributed propulsion system further comprises a plurality of cross-flow fans.

12. The tail sitter aircraft as recited in claim 9 wherein the distributed propulsion system further comprises a plurality of variable thrust cross-flow fans.

13. The tail sitter aircraft as recited in claim 9 wherein the tailboom assembly further comprises an actuator assembly operable to transition the tail arms between the forward flight configuration and the landing configuration.

14. The tail sitter aircraft as recited in claim 13 wherein the actuator assembly further comprises at least one linear actuator.

15. The tail sitter aircraft as recited in claim 13 wherein the actuator assembly further comprises at least one rotary actuator.

16. The tail sitter aircraft as recited in claim 13 wherein the actuator assembly further comprises a locking system operable to secure the tail arms in at least one of the forward flight configuration and the landing configuration.

* * * * *